United States Patent [19]
Romantschuk et al.

[11] 3,887,660
[45] June 3, 1975

[54] DEVICE FOR DISSOLVING A POORLY SOLUBLE GAS IN A LIQUID

[75] Inventors: Hakan Wilhelm Romantschuk; Pauli Unto Juhani Nyberg, both of Tampere, Finland

[73] Assignee: OY Tampella AB, Tampere, Finland

[22] Filed: Sept. 21, 1973

[21] Appl. No.: 399,492

[30] Foreign Application Priority Data
Sept. 25, 1972  Finland.............................. 2625/72

[52] U.S. Cl.................... 261/91; 210/242; 261/93; 261/120
[51] Int. Cl................................................. B01f 3/04
[58] Field of Search........ 261/91, 93, 120, DIG. 75, 261/37; 138/92, 111, 112, 148; 210/242

[56] References Cited
UNITED STATES PATENTS

| | | | |
|---|---|---|---|
| 2,130,402 | 9/1938 | Textor | 261/93 |
| 2,515,538 | 7/1950 | Wall | 261/93 X |
| 3,439,807 | 4/1969 | Danjes | 261/93 X |
| 3,497,185 | 2/1970 | Dively | 261/91 X |
| 3,536,305 | 10/1970 | Lefrancois | 261/93 |
| 3,572,658 | 3/1971 | Ravitts | 261/93 X |
| 3,572,661 | 3/1971 | Muller | 261/93 X |
| 3,630,498 | 12/1971 | Bielinski | 261/120 X |
| 3,691,230 | 9/1972 | Wesselingh | 261/93 X |

FOREIGN PATENTS OR APPLICATIONS

| | | | |
|---|---|---|---|
| 1,181,675 | 11/1964 | Germany | 261/93 |
| 1,294,466 | 10/1972 | United Kingdom | 261/91 |

OTHER PUBLICATIONS
Bruijn et al., *Journal of American Water Works Association*, Vol. 50, pp. 879–883(1958).

*Primary Examiner*—Tim R. Miles
*Assistant Examiner*—Richard L. Chiesa
*Attorney, Agent, or Firm*—Roylance, Abrams, Berdo & Kaul

[57] ABSTRACT

There is disclosed a device for dissolving a poorly soluble gas in a liquid, especially for aerating water, a device which comprises two parallel pipes fitted one inside the other, an annular throttling zone at the upper end of the inner pipe for reducing the pressure of the liquid, means for feeding the gas into the throttling zone for dissolving the gas in the liquid, and an inlet and outlet for the liquid. In this device the throttling zone has been fitted in the annular space between the pipes fitted one inside the other, while the inner pipe is connected to the inlet for the liquid, and pumping means has been provided in the inner pipe for creating a sufficient surface level difference between the inside and the outside of the device in order to cause the liquid to flow through the annular throttling zone.

4 Claims, 1 Drawing Figure

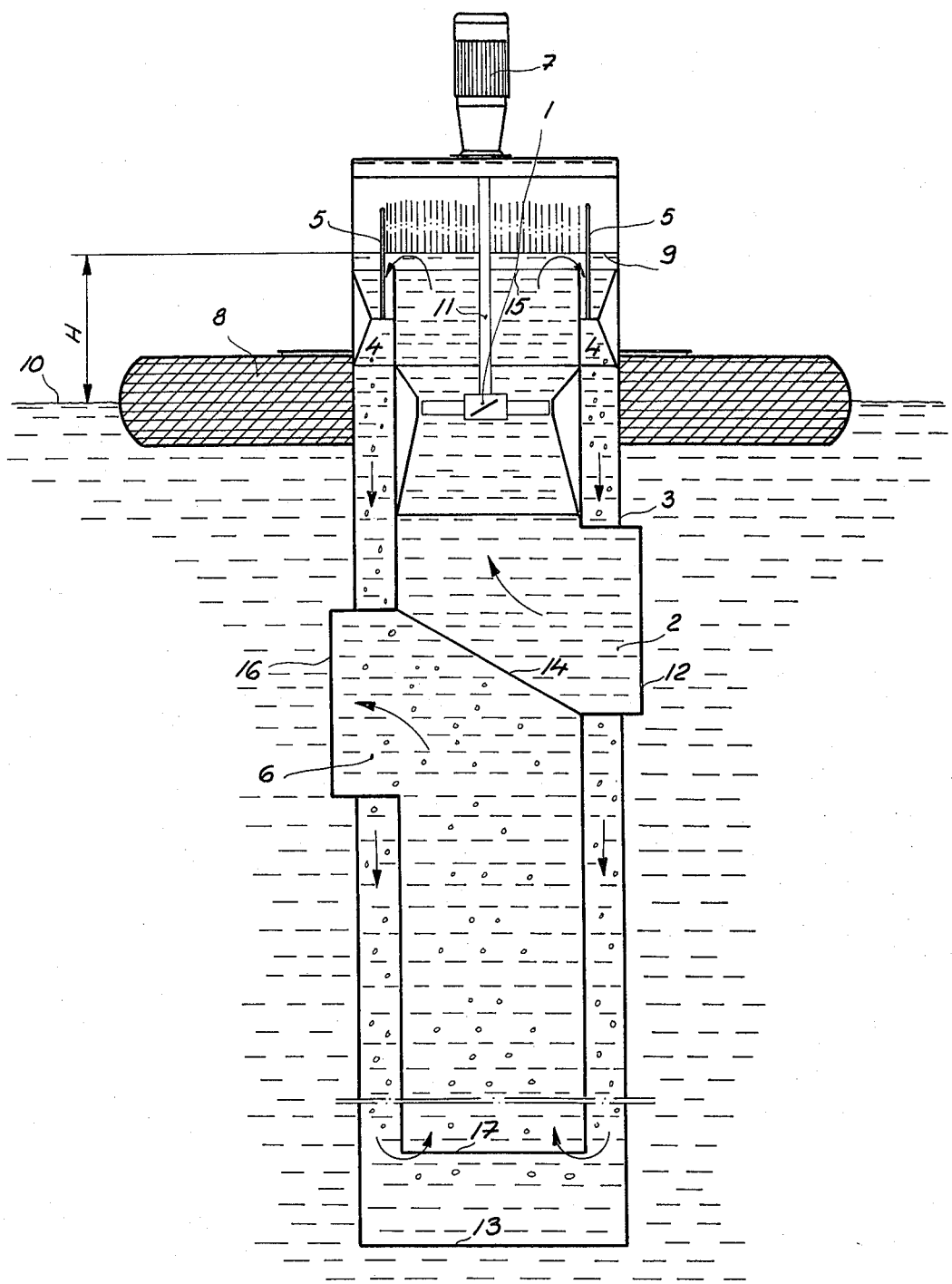

DEVICE FOR DISSOLVING A POORLY SOLUBLE GAS IN A LIQUID

BACKGROUND OF THE INVENTION

1. Field of the Invention

The invention relates to a device for dissolving a poorly soluble gas in a liquid, especially for aerating water.

2. Description of the Prior Art

So far, the following systems have been usually applied to aerating waste water:

a surface aerator which is a turbine wheel or a propeller rotating on the water surface and which causes an effective mixing of water and air feeding compressed air as finely-divided bubbles deep into the water to be aerated rotating steel brushes which bring the water to be aerated into the air in drops.

Out of the above systems, the surface aerator has also been used in a form which floats by means of a pontoon structure in a pond which consists of the water to be aerated.

Other devices are also known for aerating water, although they are, perhaps, not as commonly used as those listed above. One such device has been described by Bruin, J. and Tuinzaad in the "Journal of American Water Works Association," volume 50, page 879 (1958).

In this method the water to be aerated is fed into a vertical pipe to the depth of some 10 meters. The upper end of the vertical pipe has been provided with a ring-like throttling zone where an underpressure is created. Air is fed into the throttling zone and it becomes mixed with the water to be aerated. The water-air mixture then rises in the gap between the vertical pipe and the surrounding wall. The necessary force is obtained by means of the water level difference between the input and output sides.

The object of the present invention is to provide a device of the above-mentioned type for dissolving a poorly soluble gas in a liquid, especially for aerating water, a device with an aerating effectivity greater than that of previously known devices of the same size.

The object of the invention also is to improve the aforementioned known device so that it may be used also in places without natural water fall and make the device suitable for aeration of water in a container.

The object of the invention is further to provide a symmetric, and thereby balanced, simple aerator, fitted to a float.

SUMMARY OF THE INVENTION

In the device according to the invention the throttling zone has been fitted in the annular space between the pipes fitted one inside the other, while the inner pipe is connected to the inlet for the liquid, and pumping means has been provided in the inner pipe for creating a sufficient surface level difference between the inside and the outside of the device in order to cause the liquid to flow through the annular throttling zone.

By fixing the throttling zone in the annular space between the two parallel pipes, which have been fitted one inside the other, and not inside the upper end of the inner pipe as in the above, previously known device, an aerator is obtained of which the throttling zone where the gas becomes mixed with the liquid is greater than that of a corresponding previously known device of the same size.

A device according to the invention can also be advantageously fitted to a float, in which case the pipes fitted one inside the other and the pump device for creating the required pressure difference have been fitted concentrically around the central axis of the device to balance the device.

DESCRIPTION OF THE DRAWING

The invention is described below in more detail with reference to the enclosed drawing which shows a cross section of a preferred embodiment of the invention fitted to a float.

DESCRIPTION OF THE PREFERRED EMBODIMENT

The water to be aerated is sucked by a propeller pump through the inlet opening 12 into the vertical outer pipe 3 surrounding the inner pipe 2. A throttling zone 4 has been provided in the annular gap between the pipe 2 and the surrounding pipe 3, and the water to be aerated flows into this throttling zone under the effect of the rising height H caused by the pumping means 1. H stands for the difference between the liquid level 9 inside the device and the liquid level 10 outside it.

Air is fed into the throttling zone 4 through a gas feeding means 5 (a gap or alternatively through feeding pipes) and the air becomes mixed with the flowing water. The water-air mixture flows downwards in the gap which at the top is formed by the pipe 3 and the upper inner pipe 2 and, lower down, by the pipe 3 and the lower inner pipe 6 which is provided for the water-air mixture. In the embodiment illustrated in the FIGURE, the outlet pipe 6 and the inlet pipe 2 have been fitted so that their vertical parts have the same center line and their horizontal parts have been fitted through the wall of the pipe 3.

The propeller wheel 1 is driven by an electrical motor 7 through a shaft 11. The entire device can be attached to a float 8 or to a fixed bridge construction.

This device provides considerable advantages. The power consumption of the device is low because the pumping means works only in water and not in a mixture of water and air, in which case the pumping efficiency is high. The device does not sprinkle water into the air, a factor which is very important in winter; the water to be aerated will not substantially freeze and no ice layers will be formed on the device itself.

The mixing zone 4 for air is at a higher level than the lower water surface whereby also static suction is created at the air inlet. By altering the height position of the openings 12 and 16 different water layers may be aerated.

The actual aerating efficiency of a device like this can be reliable and easily measured and controlled.

The propeller wheel 1 sucks water into the upper inner pipe 2 through its inlet opening 12 and feeds the water through the upper end 15 of the inner pipe 2 into the outer pipe 3. The propeller wheel 1 thereby causes the water level 9 in the pipe 3 to settle at a higher level H than the outside water level 10. Owing to the height difference H, the water to be aerated and fed into the upper part of the outer pipe 3 flows by itself through the ring-like throttling zone 4, into which a ring-like feeding gap which extends to the throttling zone 4 feeds air which becomes evenly distributed in the water and dissolves in it, while the aerated water flows downwards in the intermediate space formed by the pipes 2, 3, and 6. The closed lower end 13 of the outer pipe 3 forces the aerated water to turn in through the inlet opening 17 of the lower inner pipe 6 and to flow through the pipe 6 and the outlet opening 16 into the surrounding water. The inlet 12 and outlet 16 openings have been fitted radially on opposite sides of the pipe 3 in order to balance the device. Also for reasons of balance, the motor 7 of the pump, the shaft 11, and the propeller wheel 1 have been fitted around the vertical central axis of the device.

What is claimed is:

1. A device for dissolving poorly soluble gas in a liquid in which the device is partially immersed comprising:

an inner pipe having an upper portion with a first inlet located below the surface of the liquid for conducting liquid into said pipe and a first outlet located above the surface of the liquid forming an upper through-flow channel extending between said first inlet and said first outlet;

an outer pipe coaxial with and substantially surrounding said inner pipe and having a closed lower end below the lower end of said inner pipe, said outer pipe being spaced from said inner pipe and defining therewith an annular throttling zone below said first outlet and above said first inlet;

said inner pipe having a lower portion with a second outlet communicating with the liquid below the surface of the liquid and a second inlet communicating with the interior of said outer pipe forming a lower through-flow channel extending between said second inlet and second outlet;

pumping means in said upper through-flow channel for drawing the liquid into said first inlet, out of said first outlet and into said throttling zone;

means, located in said throttling zone, for feeding a gas into the liquid in said zone; and a partition wall separating said upper portion of said inner pipe from said lower portion thereof, whereby the liquid flows downwardly through said outer pipe from said first outlet, through said throttling zone and into said second inlet.

2. A device according to claim 1, wherein said first inlet and said second outlet are directed radially outwards to the opposite sides of said inner pipe.

3. A device according to claim 1, and further including a float coupled to said outer pipe for supporting the device on the surface of the liquid, and wherein said pumping means is located along the longitudinal axis of said inner pipe.

4. A device according to claim 1, wherein said pumping means comprises a driving device, a central shaft directed vertically downward into said inner pipe, and a propeller wheel coupled at the end of said shaft.

* * * * *